Nov. 1, 1955   M. C. WILLS ET AL   2,722,066
BULLDOZING ATTACHMENT FOR TRACTORS

Filed Nov. 16, 1950   2 Sheets-Sheet 1

INVENTORS.
Marion C. Wills
Wayne J. Wills
BY
ATTORNEY.

Nov. 1, 1955  M. C. WILLS ET AL  2,722,066
BULLDOZING ATTACHMENT FOR TRACTORS
Filed Nov. 16, 1950  2 Sheets-Sheet 2
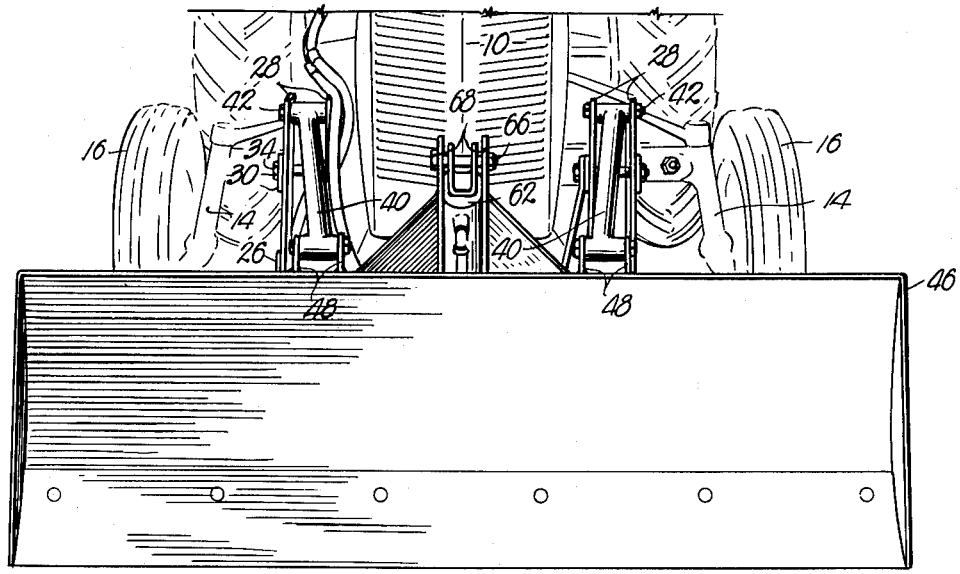
Fig. 2.
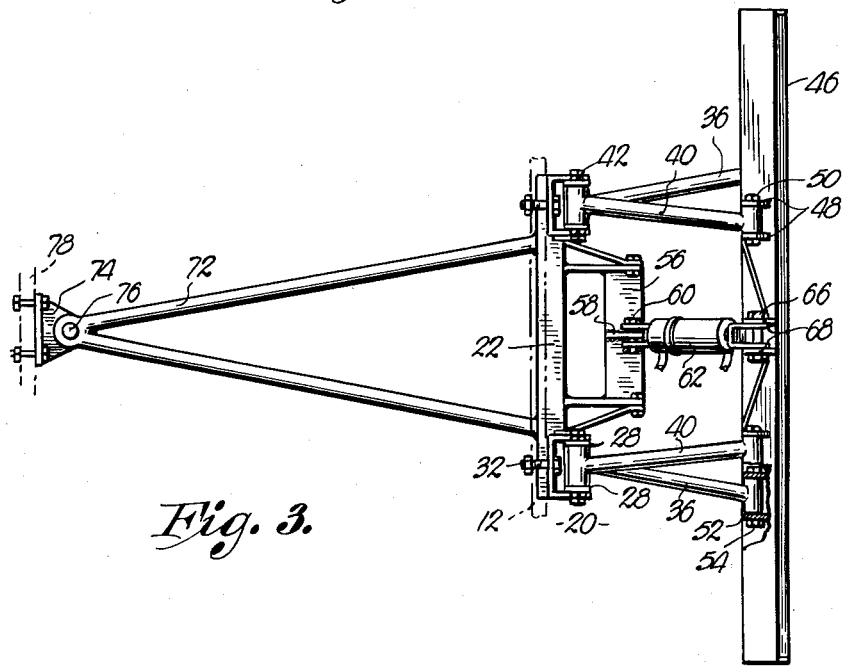
Fig. 3.
INVENTORS.
Marion C. Wills
Wayne J. Wills
BY
ATTORNEY.

2,722,066

BULLDOZING ATTACHMENT FOR TRACTORS

Marion C. Wills and Wayne J. Wills, Topeka, Kans.

Application November 16, 1950, Serial No. 195,927

2 Claims. (Cl. 37—144)

This invention relates to materials handling equipment of the kind commonly referred to as a bulldozer and has for its primary object the provision of an attachment for tractors and the like that is relatively inexpensive, adaptable for use on small projects and capable of simple attachment and removal from various types of mobile motivating devices.

It is the most important object of the present invention to provide a bulldozing attachment that includes an elongated blade swingably mounted on a specially formed frame that is in turn adapted for joinder with a tractor in such manner as to receive the full impact of a load on the blade, there being an elongated brace or thrust member underlying the tractor and extending to a point of connection at the rearmost end thereof for effectively receiving a substantial amount of such load.

Another object of this invention is to provide a bulldozing attachment wherein the aforesaid blade thereof is swingably secured to its supporting frame in such manner as to be vertically shiftable by means of an hydraulic cylinder and piston arrangement interconnecting the support and the blade.

A further object of the invention is the provision of pairs of mounting arms for the blades arranged so as to effectively stabilize the blade and reinforce the same.

Many minor objects will be set forth as the following specification progresses, reference being had to the accompanying drawings, wherein:

Fig. 2 is a front perspective view thereof; and

Fig. 3 is a top plan view of the attachment.

Figure 1:
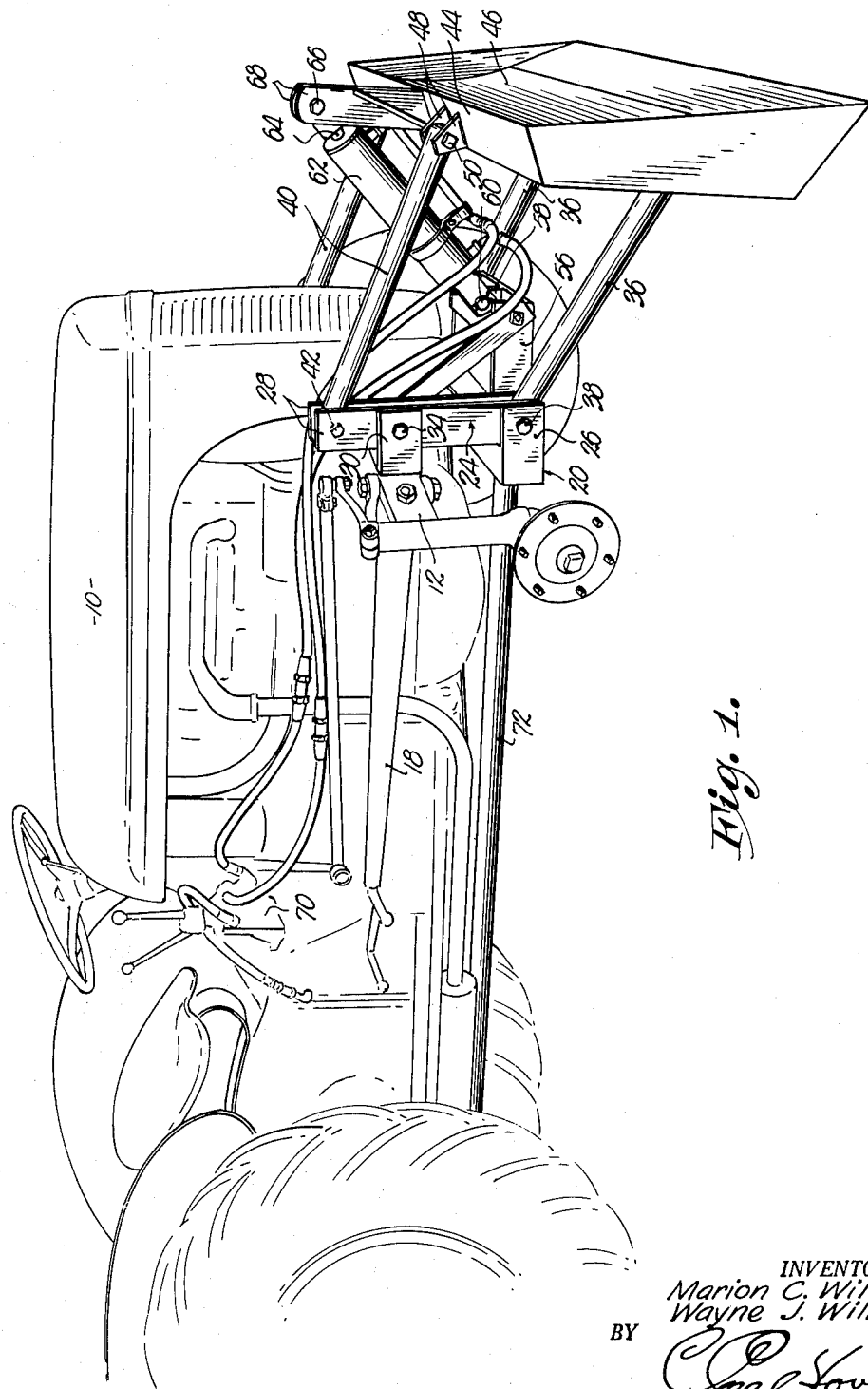
Figure 1 is a side perspective view of a bulldozing attachment made pursuant to our present invention showing the same operably mounted on a tractor.

The attachment of this invention is adapted for mounting on virtually any tractor such as illustrated in Figs. 1 and 2 of the drawings and broadly designated by the numeral 10 or other mobile vehicle of the kind provided with an attachable part such as a cross-beam 12 extending entirely across the tractor 10 near the forwardmost and thereof.

In the instant case the cross-beam 12 of tractor 10 is located forwardly of the engine but rearwardly of its radiator and relatively high above the ground for pivotally receiving arms 14 that mount the front wheels 16 of tractor 10. The frame member or cross-beam 12 is braced by an elongated bar 18 along each side respectively of tractor 10 and therefore, beam 12 is fully capable of receiving the thrust that is presented during use of the bulldozer attachment hereof.

The attachment per se includes a U-shaped frame broadly designated by the numeral 20 presenting a horizontal bight portion 22 that is positioned below and substantially parallel with the cross-beam 12 and a pair of identical uprights 24 welded or otherwise secured directly thereto and reinforced by straps 26. The uprights or legs 24 of the U-shaped frame 20 embrace the tractor at the forwardmost end thereof and each comprise a pair of spaced-apart, parallel elongated plates 28. Each upright 24 is connected directly with the cross-beam 12 by a U-shaped bracket 30 releasably connected with the beam 12 at its bight through the medium of a bolt or the like 32 and embracing the two plates 28. An interconnecting bolt 34 joins the legs of the bracket 30 with the plates 28 of uprights 24.

Each upright 24 pivotally receives a lower arm 36 by means of a pivot bolt 38 and an upper arm 40 by means of a pivot bolt 42. The two upper arms 40 are pivotally connected to an uppermost plate 44 of an elongated blade 46 by means of spaced-apart brackets 48 and an interconnecting pivot pin 50. The blade 46 is reinforced at the rearmost face thereof by two pairs of spaced-apart, parallel ribs 52 that pivotally receives the lowermost arms 36 therebetween by bolts or the like 54.

A U-shaped, lateral extension 56 on the bight 22 of frame piece 20, has a lug 58 that pivotally receives as at 60, one end of an hydraulic cylinder 62. Cylinder 62 has reciprocably mounted therein a conventional piston (not shown) provided with an extensible stem 64 which is pivotally secured at its outermost end by means of a bolt 66 between a pair of upstanding bars 68 on the top plate 44 of blade 46. The cylinder 62 and its contained piston is of conventional two-way construction operated through the medium of manual control valve 70 positioned for convenient accessibility to the operator of tractor 10.

As a further support for the frame piece 20 and for the cross-beam 12 to which frame 20 is attached, there is provided a V-shaped member 72 joined with the bight 22 of frame 20 and terminating at its apex in connection with a bracket 74 by means of a removable pin 76. The bracket 74 is joined directly with a frame from part 78 of the tractor 10 as shown only in Fig. 3 of the drawings.

It is clear that in operation, the blade 46 will be caused to rise and drop by operation of the cylinder 62 and its hydraulically driven piston. Since as the stem 64 is extended outwardly beyond the proximal end of cylinder 62 the bars 68 and the blade 46 connected thereto will rise as the arms 40 and 36 swing on the uprights 24 and pivot on the blade 46. Similarly, the lowermost edge of blade 46 can be forced in tightly against the ground or other surface by the retraction of stem 64 into cylinder 62.

It is noted that the force of the material moved by the bulldozer during forward motion of the tractor 10 is applied directly to arms 36 and 40 and thence to the uprights 24. Such force in turn is withstood by the cross-beam 12, braced as at 18 and by the bight 22 reinforced as at 72.

Another noteworthy feature lies in the fact that the uppermost arms 40 converge as the blade 46 is approched as shown in Figs. 2 and 3, whereas, the arms 36 diverge as blade 46 is approached. Such construction stabilizes the blade 46, holds the same against bending or other damage and generally provides a rigid reinforcement and support for the operating blade 46.

It is apparent that the entire attachment may be quickly and easily mounted upon the tractor 10 by simply removing or replacing the bolts 32 and the pin 76. Details of construction may obviously be altered to suit the desires of the manufacturer and such changes and modifications as fairly come within the spirit of the invention as defined by the scope of the appended claims, are contemplated thereby.

Having thus described the invention what is claimed as new and desired to be secured by Letters Patent is:

1. For a tractor having a frame including a cross-beam at the forwardmost end thereof, a bulldozing attachment comprising a support including a U-shaped frame partially embracing the tractor having a horizontal bight beneath the tractor and a pair of vertical uprights; means for attaching the uprights intermediate the ends thereof to said cross-beam; an elongated blade; an upper and a lower arm extending forwardly of each upright respectively; means pivotally joining the arms with their uprights for swinging on horizontal axes; means at the forwardmost ends of the arms pivotally attaching the same to the blade; a forward extension mounted on said bight intermediate the ends thereof beneath the tractor, a medially disposed double-acting, hydraulic cylinder and piston assembly extending upwardly and forwardly from said extension in front of the tractor and pivotally interconnecting the extension and the blade at the uppermost end of the latter; an elongated, rigid member secured to said bight and extending rearwardly therefrom beneath the tractor; and means for connecting the member to the tractor remote from said bight whereby the member absorbs the thrust of the lowermost arms and of said assembly to prevent twisting of said uprights on the cross-beam, each arm being provided with a separate, independent pivotal connection to its upright and to said blade, said connections all being spaced apart, the upper arms each being disposed directly above its corresponding lower arm at the uprights, the upper arms converging and the lower arms diverging as the blade is approached.

2. For a tractor having a frame including a cross-beam at the forwardmost end thereof, a bulldozing attachment comprising a support including a U-shaped frame partially embracing the tractor having a horizontal bight beneath the tractor and a pair of vertical uprights; means for attaching the uprights intermediate the ends thereof to said cross-beam; an elongated blade; an upper and a lower arm extending forwardly of each upright respectively; means pivotally joining the arms with their uprights for swinging on horizontal axes; means at the forwardmost ends of the arms pivotally attaching the same to the blade; a forward extension mounted on said bight intermediate the ends thereof beneath the tractor; a medially disposed, upstanding projection mounted on the uppermost edge of the blade; a medially disposed double-acting, hydraulic cylinder and piston assembly extending upwardly and forwardly from said extension in front of the tractor and pivotally interconecting the extension and the projection at the uppermost end of the latter; an elongated, rigid member secured to said bight and extending rearwardly therefrom beneath the tractor; and means for connecting the member to the tractor remote from said bight whereby the member absorbs the thrust of the lowermost arms and of said assembly to prevent twisting of said uprights on the cross-beam, each arm being provided with a separate, independent pivotal connection to its upright and to said blade, said connections all being spaced apart, the upper arms each being disposed directly above its corresponding lower arm at the uprights, the upper arms converging and the lower arms diverging as the blade is approached.

References Cited in the file of this patent

UNITED STATES PATENTS

| Number | Name | Date |
|---|---|---|
| 2,001,803 | Stephens | May 21, 1935 |
| 2,057,326 | Coates | Oct. 13, 1936 |
| 2,091,343 | Soule et al. | Aug. 31, 1937 |
| 2,228,490 | Smith | Jan. 14, 1941 |
| 2,239,943 | Sword | Apr. 29, 1941 |
| 2,242,826 | Keeler | May 20, 1941 |
| 2,256,273 | Begley | Sept. 16, 1941 |
| 2,404,759 | Washbond | July 23, 1946 |
| 2,485,407 | Peterson | Oct. 18, 1949 |
| 2,565,337 | Allan | Aug. 21, 1951 |
| 2,645,866 | McGee | July 21, 1953 |